3,153,326
HYDRAULIC TRANSMISSION PUMP MOUNTING
Robert Roy Madson, Grosse Isle, Mich., assignor to Rockwell-Standard Corporation, Coraopolis, Pa., a corporation of Pennsylvania
Filed Sept. 13, 1960, Ser. No. 55,738
4 Claims. (Cl. 60—54)

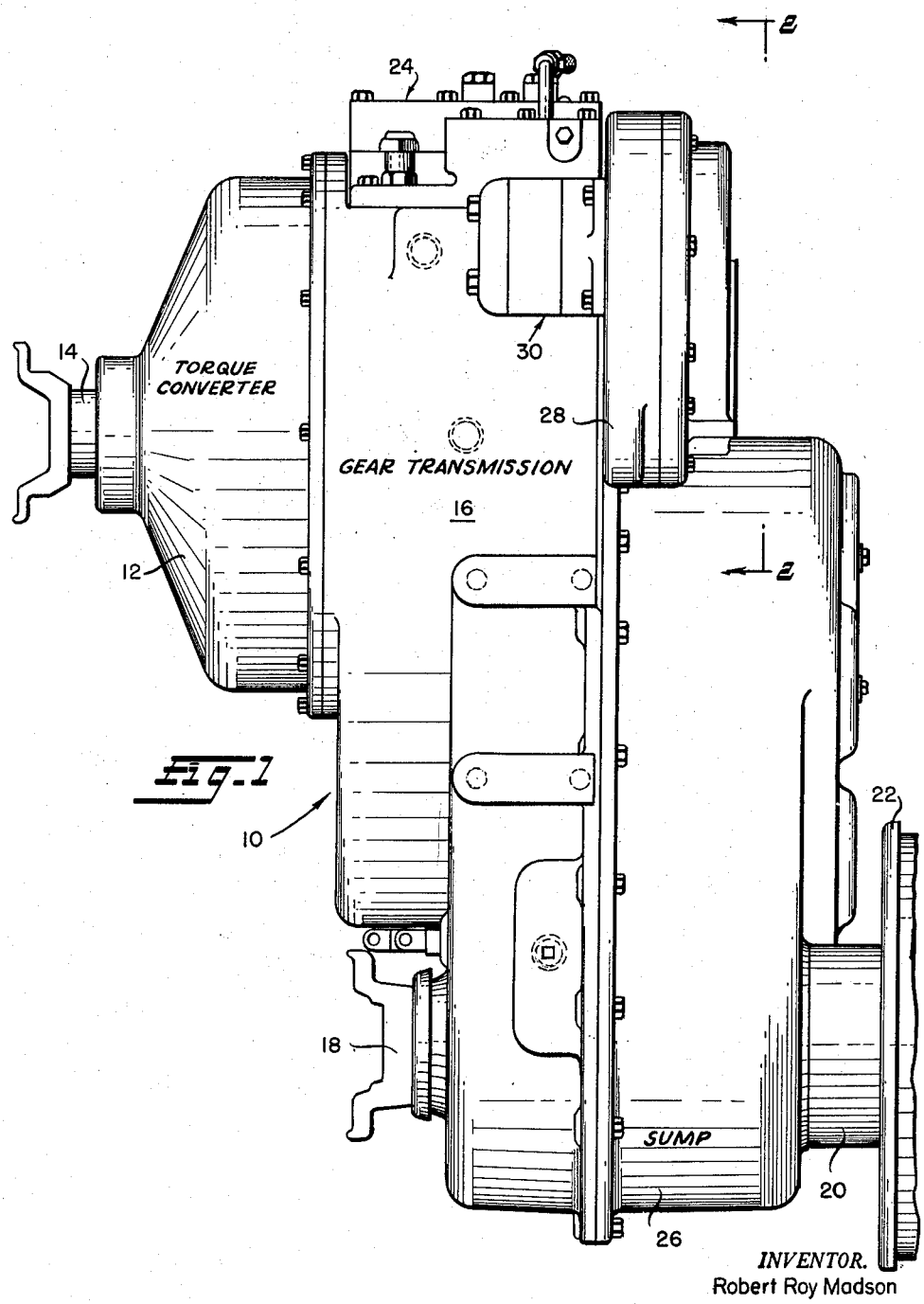

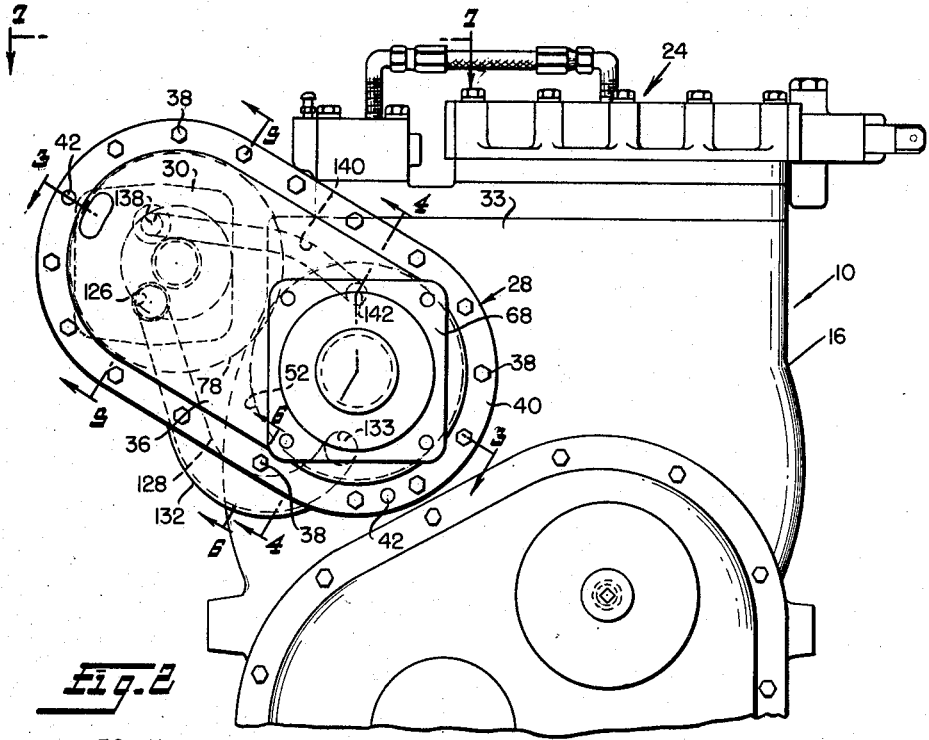
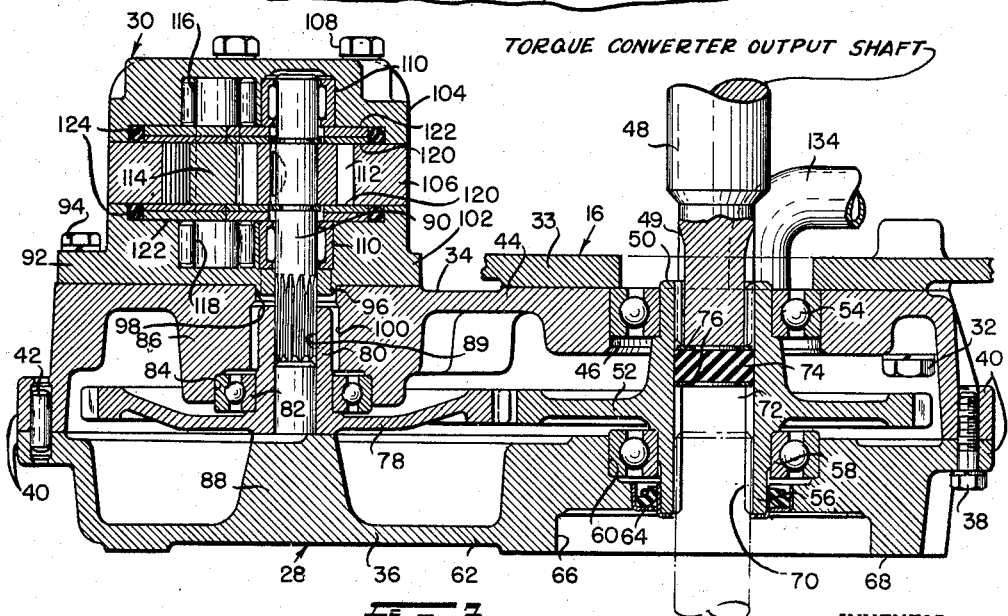

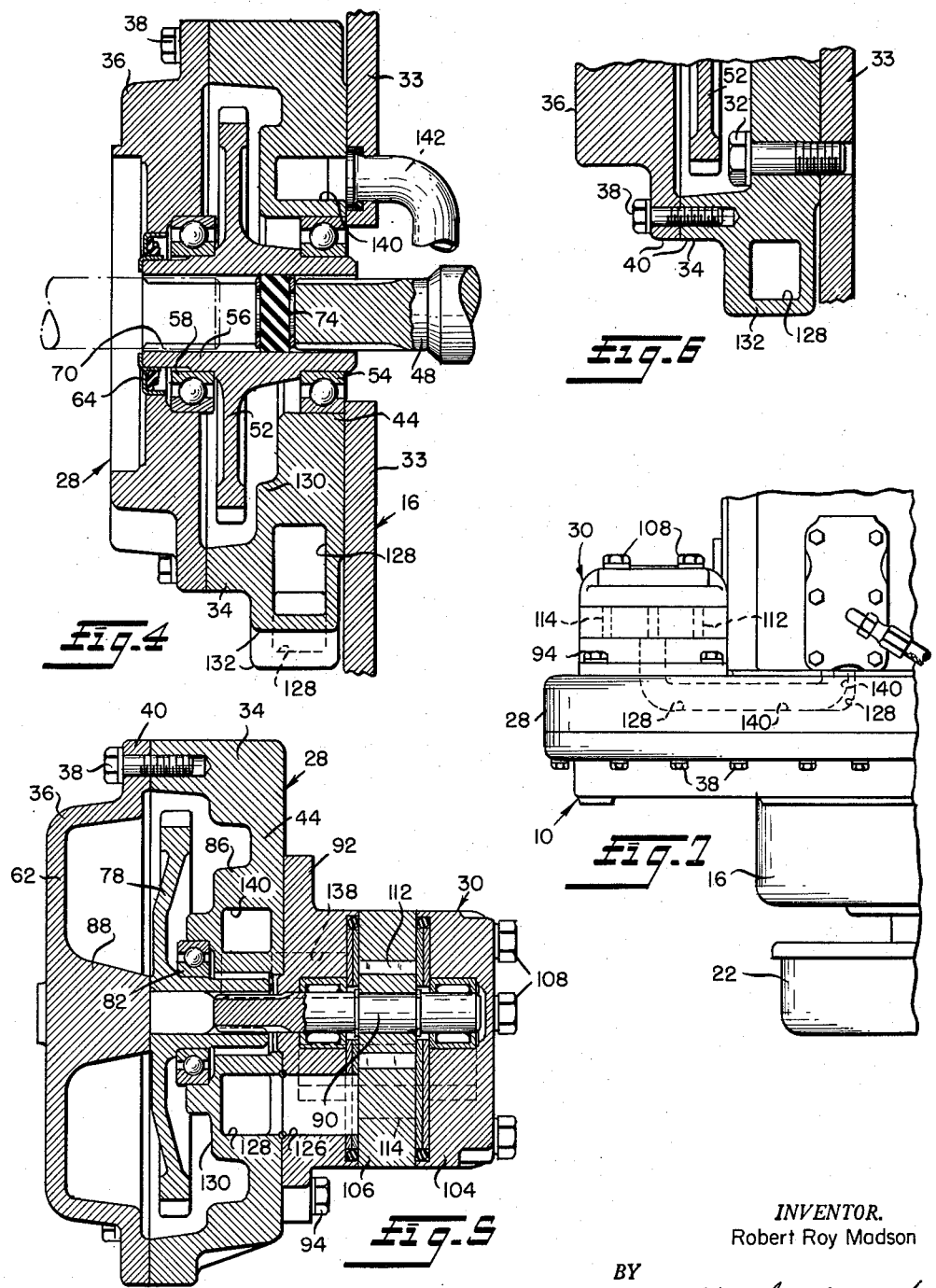

The present invention relates to hydraulic torque converter transmissions having hydraulically actuated gear shift mechanisms and more particularly to improved pumps and accessory drive mounting assemblies for use with such transmissions.

In power transmissions of the type referred to herein, which are especially adapted for heavy or special purpose vehicles, in many instances it is desired to provide separate pumps for supplying the fluid torque converter with circulating fluid and sufficient pressure for the hydraulic gear shifting mechanisms. Also it may be desired to mount implement or accessory drive pumps in convenient locations directly to the transmission housing to be driven by internal components therefrom. To accomplish this, power-take-off mechanisms may be provided which are driven by gear components of the transmission. In modern vehicle constructions, especially those serving special purposes, the space available to mount accessory drives is usually very restricted and difficulties occur in designing and constructing such transmissions without exceeding the space limitations or costs or sacrificing sound engineering principles.

Although it has been common practice in fluid torque converter transmissions to incorporate the pump integrally with drive components of the transmission which are directly driven by the engine and within the transmission housing it has been found that servicing and maintenance of such pumps is extremely difficult because the entire transmission must be disassembled to get at the pump causing increased cost and time delay. For this reason it has been suggested to mount the pump externally of the transmission housing, but here space limitations as mentioned before restricted widespread application especially in instances where it was desired to also mount a power-take-off and/or auxiliary pump drive.

The mounting of the transmission charging pump externally of the transmission housing led to a far more serious difficulty, i.e. the mounting of the fluid conduits or pipes leading from or into the external pump into or from the transmission housing to protect them from damage during operation of the vehicle. External conduits or pipes are also susceptible to damage due to corrosion and dirt accumulation especially at the pipe fittings which eventually seize in their joints and cannot be loosened to permit maintenance work without damaging the fittings.

Other inherent disadvantages of such prior external pump mountings included excessive costs, difficult assembly and, in many instances, severe leaking problems which have been effectively solved by the novel assembly of the present invention which includes a power-take-off mechanism, to which is attached the external transmission charging pump and which is mounted on the transmission housing in such way as not to interfere with other vehicle components and which provides internal integral fluid communication means.

Accordingly, it is an object of the present invention to provide in hydraulic torque converter mechanisms an external pump for the transmission which is attached to a power-take-off mechanism driven from an internal, engine-connected gear drive and mounted in such way as to facilitate assembly, servicing and maintenance and which provides means for simultaneously driving accessories without unduly increasing the overall size of the transmission.

Another object of the present invention is the provision of an external pump mount for a power transmission in which all external conduits are eliminated, thus eliminating a source of potential damage.

A further object of the present invention is to provide a power-take-off mechanism attached to and driven from a hydraulic torque converter mechanism and which provides a drive for a power transmission charging pump and other implements.

Still another object of the present invention is the provision of a power-take-off housing incorporating internally machined or cast fluid conduits in one of the housing walls to communicate with corresponding conduits of an attached pump and power transmission.

Other objects and novel features will become readily apparent from the following detailed description in connection with the appended drawings in which:

FIGURE 1 is a side view of a combined torque converter and power transmission embodying the present invention;

FIGURE 2 is an enlarged rear view of the upper half of the transmission of FIGURE 1 showing especially the power-take-off in more detail;

FIGURE 3 is an enlarged section through the power-take-off mechanism substantially along line 3—3 of FIGURE 2;

FIGURE 4 is a transverse section through one part of the power-take-off taken along line 4—4 of FIGURE 2;

FIGURE 5 is another transverse cross-section through the pump attached part of the power-take-off substantially along line 5—5 of FIGURE 2;

FIGURE 6 is a partial section through the lower housing part of the power-take-off taken along line 6—6 of FIGURE 2; and FIGURE 7 is a partial top plan view of the transmission of FIGURE 2.

With reference to FIGURE 1 there is illustrated in outline a vehicle transmission in a housing 10 and composed of a fluid torque converter housing 12 which may enclose a conventional torque converter (not shown) driven from a shaft 14 in the usual manner connected to the vehicle engine (not shown). The torque converter may be connected to drive a multispeed-multistage gear transmission (not shown) in the main housing part 16 from which driving power may be directed to the front wheels of the vehicle (not shown) via a shaft and yoke connection 18 and to the rear wheels (not shown) via a like universal connection 20 mounted in this instance within a transmission brake construction indicated at 22.

The gear transmission enclosed in housing part 16 will be preferably of the power shift type and actuated by hydraulic shift mechanism the selector valve body of which is shown at 24 at the top of the housing 10. To provide the mechanism of the transmission thus far described with a supply of hydraulic fluid, first for the torque converter, secondly for the hydraulic gear shift mechanism and thirdly for lubrication purpose the lower part 26 of the housing part 16 is preferably designed to contain the usual oil sump which is filled at assembly with the proper amount of oil.

In operation the oil must be delivered from the low positioned sump in the bottom section 26 of housing part 16 into the hydraulic mechanism to supply a continuous circulating flow of fluid into the torque converter enclosed in housing 12 and into the selector valve body 24 to the hydraulic gear shift mechanism (not shown). Excess oil from the torque converter is thrown out and circulated through internal lubrication passages (not shown) in housing 10 to lubricate the running parts of the mechanism from which it subsequently flows back into the sump.

To operate the hydraulic gear shift mechanism of the transmission 10 reversible low and high pressure oil has to be provided in the conduits leading to the shift mechanism whereas the supply of fluid to the torque converter should be at a constantly low or lube pressure. To accomplish this, properly designed high and low pressure control valves (not shown) may be incorporated so that fluid flow to the torque converter and hydraulic shift mechanism may be provided by one pump only which is usually driven from an output member of the torque converter. The drive gear ratio of a single pump installation has then to be such as to obtain adequate pressure to operate the gear shift mechanism when the engine, to which the torque converter is connected, is idling. Alternatively, separate pumps having different characteristics must be provided to deliver oil under the proper pressures for the torque converter and hydraulic gear shift mechanism.

As mentioned above, conventional power transmissions usually employ an internal, integral gear type pump driven from an output member of the torque converter directly or through a reduction gear. Assembly, service and maintenance for this type pump is very difficult. There have been various proposals to mount the pump outside the transmission housing but up to the present invention no satisfactory solution has been found meeting space limitations as required by other vehicle components and by a power-take-off mechanism and eliminating the external mounting of the fluid pipes or conduits which could be easily damaged in that position.

With further reference to FIGURES 2 and 3, the present invention provides a combined external pump and power-take-off mechanism which comprises in general a power-take-off housing 28 and gear type pump 30 attached thereto. The power-take-off housing 28 is attached by means of bolts 32 (FIGURE 3) to the rear wall 33 of the transmission housing 16 near its left hand upper corner and is of generally oblong rectangular shape extending angularly beyond the edge of the transmission housing. Power-take-off housing 28 comprises a front shell-like part 34 and rear shell-like part 36 which are attached together as by means of capscrews 38 set in complementary circumferential flanges 40 thereof. Dowel pins 42 assure correct aligned assembly of both housing parts 34 and 36. The front wall 44 of housing part 34 is provided with an aperture 46 where the power-take-off housing 28 is attached to the transmission housing 16 and through which an output shaft 48 extends which is driven by an output member of the torque converter (not shown). The end of shaft 48 which extends into power-take-off housing 28 is splined as at 49 to accommodate the attachment of the front hub end 50 of a spur gear 52 journalled in anti-friction bearings 54 supported in aperture 46. The rear hub end 56 of spur gear 52 is journalled in another aligned anti-friction bearing 58 supported in a coaxial aperture 60 in the wall of the rear housing part 36. A seal 64 adjacent bearing 58 preevnts escape of lubricant and entry of foreign matter into power-take-off housing 28. Adjacent the seal 64 the rear surface of rear part 36 is recessed as at 66 to provide a mounting pad 68 (FIGURE 2) to accommodate the attachment of an auxiliary pump drive, implement drive or other equipment, if desired. The rear hub 56 is splined as at 70 to receive the shaft of the auxiliary apparatus.

The internal bore 72 of the gear 52 is sealed by a rubber seal pad 74 secured therein as by snap rings 76 to prevent entry or escape of lubricant from or into the transmission housing 16 along the splines 49.

Spur gear 52 is in constant mesh with another similar spur gear 78 the hub 80 of which is journalled in anti-friction bearings 82 supported in a recess 84 of a boss 86 extending from the front housing wall 44. Another opposite boss portion 88 extends inwardly from the rear wall 62 and abuts the hub 80 of gear 78 to assure proper alignment with gear 52 and to provide proper bearing compression.

The hub 80 of spur gear 78 is provided with internal splines 89 to receive the correspondingly splined end of a pump shaft 90 which extends into the charging pump 30 (FIGURES 3 and 5). Pump 30, which may be a standard commercially available gear type pump with a few changes to adapt it to the present application is secured by means of a mounting flange 92 and screws 94 to the outside of front wall 44 of power-take-off 28 and extends forwardly along the side of the transmission housing 16 as clearly shown in FIGURES 1, 2 and 7. A pilot flange 96 is provided where the pump shaft 90 enters the pump which seats in the reduced diameter portion 98 of the aperture 100 within the boss 86 of the front wall 44 to assure proper axial alignment of the pump shaft 90 with the gear 78.

Pump 30 may comprise a rear housing part 102, a front housing part 104 and an intermediate pump chamber part 106 which are held together in assembled relation by bolts 108. The pump shaft 90 is journalled in needle type roller bearings 110 in the front and rear housing parts at opposite sides of the pump chamber 106. A spur type gear 112 is secured to the pump shaft 90 within the pump chamber 106 which meshes with a similar gear 114 secured to an opposite counter shaft 116 journalled in needle bearings 118. Thrust plates 120 and spacers 122 partition the pump chamber part 106 from the other housing parts 102 and 104 and provide the necessary pressure load for the pump gears 112 and 114. The pump chamber 106 is sealed off by means of fluid seals 124.

With further reference to FIGURES 4 to 7, the pump 30 is provided at its flanged rear end which abuts the front wall 44 of the power-take-off 28 with an inlet port 126 (FIGURES 2 and 5) which leads into the pump chamber 106 centrally between the pump gears 112 and 114 and which communicates with an inlet channel or conduit 128 cast or machined integrally within the front wall 44 of the power-take-off which for this reason is circumferentially provided along the conduit bore with a boss portion 130. Integral inlet conduit 128 extends within the front wall 44 into an integral extension 132 formed in front housing wall 44, as illustrated in FIGURES 2 and 6.

From the semi-circular extension 132 the conduit is slightly curved and connects to an inlet port 133 in the transmission rear housing wall 33 (FIGURE 2) which communicates with a suction pipe 134 (FIGURE 3) within the transmission housing 16 which leads to the oil sump in lower housing part 26. The curved section of the inlet conduit 128 within the wall extension 132 (FIGURE 2) provides a suction head each time the transmission starts to operate after a stop.

The pump 30 is also provided with an outlet port 138 opposite and on the same centerline as inlet port 126 (FIGURE 2) which enters the pump chamber 106 between the pump gears 112 and 114 (FIGURES 2 and 5) and communicates with an outlet channel or conduit 140 integrally formed within the front wall 44 of the power-take-off 28 opposite inlet conduit 128 (FIGURES 2, 4 and 5). Outlet conduit 140 extends within the front wall 44 to connect to a supply pipe 142 which extends through transmission rear wall 33 into the transmission housing 16 (FIGURE 4) above inlet port 133 (FIGURE 2) and supplies hydraulic fluid to the torque converter and/or the selector valve body 24.

In operation, when the vehicle engine starts to turn the torque converter pump wheel this motion is directly or by gear reduction transmitted to the output shaft 48 (FIGURE 3) which rotates gears 52 and 78 which starts the pump 30. Hydraulic fluid is then sucked from the sump in lower housing part 26 via the suction pipe 134 (FIGURE 3) into the inlet conduit 128 within housing wall 44 and into pump chamber 106 of the pump 30 from which it is pumped into the outlet conduit 140 and into the supply pipe 142 within transmission housing 16 (FIGURE 4) which leads to inlet ports for the torque converter and/or selector valve body 24.

Thus a continuous recirculating flow of fluid for both the torque converter and hydraulic shift mechanism is provided.

By mounting the pump externally of the transmission housing, assembly, servicing and maintenance of the pump is greatly facilitated and costs are reduced.

The present invention avoids the use of external piping in spite of the external remote pump mounting by providing integrally formed fluid conduits within a power-take-off housing on which the pump is mounted. The integral conduits can be easily machined or cast and avoid the use of costly pipe fittings further reducing costs and possibility of damage.

If desired, the direction of rotation of the pump 30 may be reversed by incorporating a small idler gear in the power-take-off unit preferably between the gears 52 and 78. This can be done without substantially changing the size or configuration of the unit.

The power-take-off unit is provided with means for the mounting of an additional pump or accessory drives without interference with the mounting of the charging pump. Also the power-take-off can accommodate dual or triple pump mountings without substantial change in the configuration of the unit.

The power-take-off and pump assembly is compact and attached to the transmission housing in such way as not to unduly increase the overall size of the transmission or to interfere with other structural vehicle components. Since the unit is compact and yet is provided with a relatively large flat unobstructed mounting area, it can be mounted in any convenient position which may be dictated by the requirements of a particular installation.

The present invention may be embodied in other specific forms without departing from the essential spirit and characteristic thereof, therefore the present embodiment is to be considered in all respects as illustrative only and not restrictive, the scope of the invention being indicated by the appended claims rather than by the foregoing description.

What is claimed and desired to be secured by United States Letters Patent is:

1. For use in combination with a hydraulic transmission enclosed in a housing and having internal fluid inlet and outlet conduits and a drive shaft extending through an aperture in the wall of said housing, a sealed secondary housing having means whereby it may be detachably secured to said hydraulic transmission housing wall to close said aperture and receive the end of said shaft, a pump within said secondary housing, said conduits extending through said transmission housing to openings in said wall, means forming internal passages in said secondary housing connecting said inlet and outlet wall openings, respectively, to the outlet and inlet sides of said pump, and a gear drive in said secondary housing drivingly connecting said shaft and said pump, the hub of one of the gears in said gear drive being in open communication with the exterior of said secondary housing and including means for a driving connection to an auxiliary apparatus.

2. In combination with a hydraulic transmission enclosed in a housing, said housing having a pair of angularly related walls joined at a corner and said transmission having internal inlet and outlet conduits and a drive shaft projecting through an aperture formed in one of said walls adjacent said corner, said conduits extending through said transmission housing to openings in one of said walls, a secondary housing detachably secured to said one wall of said transmission housing, said secondary housing covering said aperture and having a portion projecting beyond said corner, a pump secured to said projecting portion of said secondary housing and extending generally along the other of said walls, said secondary housing having internal passages connecting said pump and said inlet and outlet wall openings, a gear drive in said secondary housing drivingly connecting said shaft and said pump, the hub of one of the said gears in said gear drive being in open communication with the exterior of said secondary housing and including means for a driving connection to auxiliary apparatus.

3. In combination, a hydraulic transmission enclosed in a housing having internal fluid inlet and outlet conduits, said housing having a pair of angular related walls joined at a corner and a drive shaft projecting through an aperture in one wall of the housing adjacent said corner, said conduits extending through said transmission housing to openings in said one wall, a shell-like secondary housing part detachably secured to said transmission housing in surrounding relation with said aperture and projecting laterally therefrom beyond said corner, a second shell-like housing part secured to said first shell-like part, a pump carried by said laterally projecting portion of said first shell-like part extending generally along the other of said walls, means forming internal passages in said secondary housing parts connecting said inlet and outlet wall openings respectively to the outlet and inlet sides of said pump, a pair of meshing gears mounted in said secondary housing parts drivingly connecting said shaft and said pump, said second shell-like housing part having an opening aligned with the hub of one of said gears which includes means for connecting said one gear to auxiliary apparatus.

4. In combination with a hydraulic transmission having a housing adapted to contain hydraulic fluid and a driven power take-off shaft extending through a rear wall aperture, a pump housing detachably secured upon said transmission housing rear wall over the end of said projecting shaft, drive mechanism within the pump housing connecting said shaft to a pump unit, means providing internal fluid passages through the housing walls between the interior of said transmission housing and the pump, and means providing a power take-off drive connection in said drive mechanism accessible through an aperture in a rear wall of said pump housing, comprising a gear formed on one side to receive said shaft and at the other side to provide said power take-off drive connection.

References Cited in the file of this patent

UNITED STATES PATENTS

| | | |
|---|---|---|
| 1,723,493 | Schotthoefer | Aug. 6, 1929 |
| 1,742,215 | Pigott | Jan. 7, 1930 |
| 2,565,203 | Churchill | Aug. 21, 1951 |
| 2,676,497 | Ahlen | Apr. 27, 1954 |